United States Patent [19]
Park et al.

[11] Patent Number: 5,737,454
[45] Date of Patent: Apr. 7, 1998

[54] FACSIMILE SYSTEM HAVING A FUNCTION OF PROCESSING A PERSONAL MESSAGE AND A METHOD THEREFOR

[75] Inventors: You-Il Park, Suwon; Yoon-Soo Kim, Seongnam, both of Rep. of Korea

[73] Assignee: SamSung Electronics Co., Ltd., Suwon, Rep. of Korea

[21] Appl. No.: 562,553

[22] Filed: Nov. 24, 1995

[30] Foreign Application Priority Data

Nov. 25, 1994 [KR] Rep. of Korea ............... 1994 31162

[51] Int. Cl.⁶ ............................................. H04N 1/44
[52] U.S. Cl. ........................... 382/284; 358/438; 358/450; 358/405; 380/18
[58] Field of Search ............................... 358/400, 405, 358/406, 443, 448, 450, 468, 540, 434–436, 438–444, 404; 380/18; 382/284; 348/540, 586, 589; H04N 1/44

[56] References Cited

U.S. PATENT DOCUMENTS

| | | |
|---|---|---|
| 5,163,088 | 11/1992 | LoCascio . |
| 5,255,106 | 10/1993 | Castro . |
| 5,257,119 | 10/1993 | Funada et al. . |
| 5,287,203 | 2/1994 | Namizuka ............................. 358/443 |
| 5,291,305 | 3/1994 | Sakashita et al. . |
| 5,309,245 | 5/1994 | Hayashi et al. ...................... 358/450 |
| 5,351,136 | 9/1994 | Wa et al. . |
| 5,353,124 | 10/1994 | Chou et al. . |
| 5,363,202 | 11/1994 | Udagawa et al. ................... 358/468 |
| 5,465,160 | 11/1995 | Kamo et al. . |
| 5,465,161 | 11/1995 | Funada et al. . |
| 5,485,287 | 1/1996 | Nakamura et al. .................. 358/468 |
| 5,535,277 | 7/1996 | Shibata et al. ...................... 380/18 |
| 5,541,741 | 7/1996 | Suzuki ................................. 358/450 |

*Primary Examiner*—Kim Vu
*Attorney, Agent, or Firm*—Robert E. Bushnell, Esq.

[57] ABSTRACT

A facsimile device having a function of processing a personal message. The facsimile device includes a scanner for scanning document; a data storing unit for additively storing predetermined image data in image data scanned by the scanner; an encoding unit for encoding data stored in the data storing unit; a data modulating unit for modulating and then sending the encoded data to a remote recipient station via a telephone line; a data demodulating unit for demodulating modulated data received from either the remote recipient station or another remote station; a decoding unit for decoding the coded data; and a printing unit for printing the decoded data outputted from the decoding unit by a predetermined unit.

20 Claims, 4 Drawing Sheets

An automatic answering device for a vehicle ratio-telephone has a voice synthesi circuit for synthesizing and dellevering three different selectable digitally st answering message to caller, and a voice andlyzing and synthesizing circuit for -tronically processing and reodrding incoming message from callers.
Three modes of answering can be selected by the users and are performed under mi— essor control for ar having only and informing callers of a number to calls of —bef to call for requesting callers to input key signals for representing —er's telephone number, and for recording a caller's voice massage.
For each of three modes, a different appropriate answering message is synthesize 
FACSIMILE SYSTEM HAVING A FUNCTION OF PROCESSING A PERSONAL MESSAGE AND A METHOD THEREFOR

CROSS-REFERENCE TO RELATED APPLICATIONS

This application makes reference to, incorporates the same herein, and claims all benefits accruing under 35 U.S.C. §119 from an application for A Facsimile System Having A Function Of Processing A Personal Message And A Method Therefor earlier filed in the Korean Industrial Property Office on 25 Nov., 1994 and assigned Ser. No. 31162/1994.

BACKGROUND OF THE INVENTION

1. Technical Field

The present invention relates to a facsimile system, and more particularly a facsimile system having a function of processing a personal message by utilizing a background image.

2. Background Art

As facsimile machines have become a standard office device and an efficient means to insure rapid transmission of information, and the information themselves have become increasingly private in nature, it has been necessary for the facsimile machines to process sensitive messages with a certain degree of security and confidentiality.

One conventional technique for handling sensitive messages over the facsimile transmission line is to provide a facsimile machine at each sensitive location with a code access for transmission and reception such as disclosed, for example, in U.S. Pat. No. 5,351,136 for Facsimile Apparatus And Method For Sending And Receiving Private Information issued to Wu et al., and U.S. Pat. No. 5,353,124 for Method Of Providing Confidential Treatment For Facsimile Transmission issued to Chou et al. For example, in Wu '136, the facsimile sender must input identification code of the intended recipient of confidential information before transmission of that confidential information. At a receiving side, the intended recipient must then verify that he/she is the intended recipient before the confidential information can be delivered. In Chou '124, on the other hand, the facsimile sender must incorporate a graphic pattern of the intended recipient's key in a predetermined location of the first page of the confidential information before transmission of that confidential information. At a receiving side, the facsimile machine searches for the presence of the intended recipient's key for either immediate printing if the key is not found, or for storage for subsequent retrieval by the intended recipient having a proper password. This technique however requires complex circuit construction and increases cost. Moreover, it is not effective as access codes quickly become known within an office.

Another conventional technique for handling sensitive messages over the facsimile transmission line is to visibly conceal a confidential message portion of the facsimile message to be reproduced at a receiving side as disclosed, for example, in U.S. Pat. No. 5,255,106 for Method And Apparatus For Delivering Secured Hard-Copy Facsimile Documents issued to Castro. This technique also requires sophisticated and costly circuit construction.

Perhaps, a more effective, yet less costly means to handle facsimile message of a confidential nature is to insert a marking such as, the name of the intended recipient normally at the top of each facsimile paper so that the facsimile document can be directed to the intended recipient only. One problem with this technique, as we have recently observed, is that it has been inconvenient for the sender to direct printing of the intended recipient's name on each and every sheet of facsimile papers; otherwise, a facsimile message of the confidential nature may not be directed to the intended recipient.

SUMMARY OF THE INVENTION

Accordingly, it is therefore an object of the present invention to provide a process and a facsimile system capable of providing confidential treatment for facsimile transmissions in a simple, yet cost effective manner.

It is another object to provide a process and a facsimile system capable of processing a personal message addressed only to an intended recipient in the background of the main text of the facsimile message so that the facsimile message can be securely directed to the intended recipient.

It is also an object to provide a process and a facsimile system capable of superimposing a personal message such as an intended recipient's name input manually by a sender, on a facsimile message for transmission over a telephone line to be printed at the intended recipient's facsimile system on each sheet of facsimile papers.

To achieve these and other objects, the present invention envisions a facsimile system having a scanner for scanning a document bearing information; an operational panel for allowing the sender to input personal data representing a confidential message to be printed in the background of the information; a data storing unit for additively storing the personal data in image data obtained by the scanner; an encoding unit for generating encoded data by encoding composite image data stored in the data storing unit representing the information on the scanned document and the confidential message input by the sender to be printed the background of the information; a modulating unit for modulating and transmitting the encoded data to a remote recipient station via a telephone line for enabling the remote recipient station to print the encoded data; a demodulating unit for generating demodulated data by demodulating modulated data received from either the remote recipient station or another remote station via the telephone line; a decoding unit for generating decoded data by decoding the demodulated data; and a printing unit for printing the decoded data by a predetermined unit.

The present invention also contemplates a method for processing a personal message in a facsimile device by scanning the content of a document to obtain image data corresponding to the scanned content of the document. Background data representative of a confidential message is input manually by a sender to be printed in the background of the image data. The background image data is stored additively in the image data corresponding to the scanned content of the document as composite image data and encoded data is generated by encoding the composite image data representative of the scanned content of the document and the confidential message in the background of the scanned content of the document. The encoded data is modulated and transmitted to a remote recipient station via a telephone line for enabling the remote recipient station to print the encoded data having the confidential message superimposed on the background of the document printed by the remote recipient station.

The present invention is more specifically described in the following paragraphs by reference to the drawings attached only by way of example.

BRIEF DESCRIPTION OF THE DRAWINGS

A more complete appreciation of the present invention, and many of the attendant advantages thereof, will become readily apparent as the same becomes better understood by reference to the following detailed description when considered in conjunction with the accompanying drawings in which like reference symbols indicate the same or similar components, wherein:

FIG. 3 illustrates how image data are processed between respective memories 22, 24, 28 of FIG. 1.

FIG. 4 illustrates an example of how the personal message entered by the facsimile sender is printed in the background of the facsimile message in a facsimile system according to the present invention.

FIG. 5 illustrates an example of how only a character "H" of image data is printed as shown in FIG. 4.

DETAILED DESCRIPTION OF THE PREFERRED EMBODIMENT

Figure 1:
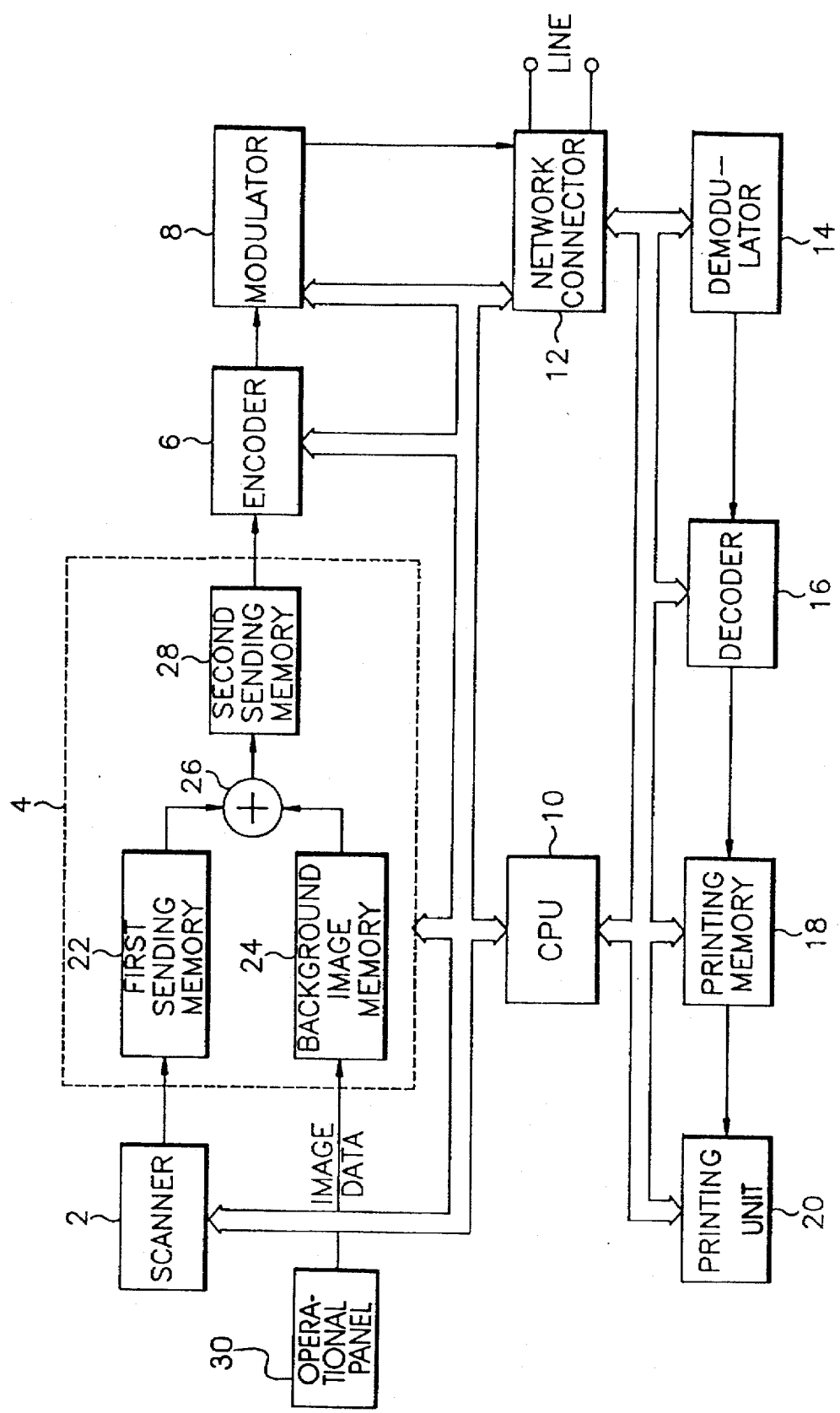
FIG. 1 is a block diagram illustrating a facsimile system as constructed according of the principles of the present invention.

Referring now to the drawings and particularly to FIG. 1, which is a block diagram illustrating an improved facsimile system as constructed according to the principles of the present invention. The facsimile system as shown in FIG. 1 includes a scanner 2 for scanning a succession of discrete pages of a multi-page document bearing information and obtaining first image data representing the information. A data sending memory unit 4 may use a first sending memory 22 for storing image data corresponding to each discrete page of a document or a multi-page document; a background image memory 24 for storing background image data representing a personal message input manually by a user by way of an operational panel (OP) 30 to be printed in the background of the image data corresponding to each discrete page of the multi-page document, a logical adder 26 for combining the background image data stored in the background image memory 24 into the image data corresponding to each discrete page of the document or the multi-page document stored in the first sending memory 22, and producing composite image data representing the information of each discrete page of the document or the multi-page document and the personal message superimposed in the background therein, and a second sending memory 28 for storing the composite image data. An encoder 6 is used for encoding the composite image data. A modulator 8 is used for modulating the encoded data and sending the modulated data to a network connector 12 for transmission to an intended recipient's facsimile machine over a telephone line. A demodulator 14 is used when the facsimile system receives modulated data transmitted from a remote facsimile station. A decoder 16 then decodes demodulated data; and a printing memory 18 temporarily stores the decoded data to be printed by a printing unit 20.

In the following description, it should be noted that the transmission and reception of facsimile message by the facsimile system are controlled by a central processing unit 10 (hereinafter, referred to as "CPU"). First, the transmission operation of the sender's facsimile is described as follows.

A scanner 2 scans the image data with a resolution determined by a protocol set in the facsimile system, converts the scanned image data into two image data, that is, uncoded pure black and white image data, and then stores the image data in a data sending memory unit 4. An encoder 6 encodes the uncoded data stored in the data sending memory unit 4 and inputs the encoded data to a modulator 8. The modulator 8 then modulates the encoded data and inputs analog-modulated data to a network connector 12. At this time, the network connector 12 forms a talking loop of a telephone line in order to transmit the analog-modulated data to the intended recipient's facsimile machine.

Figure 2:
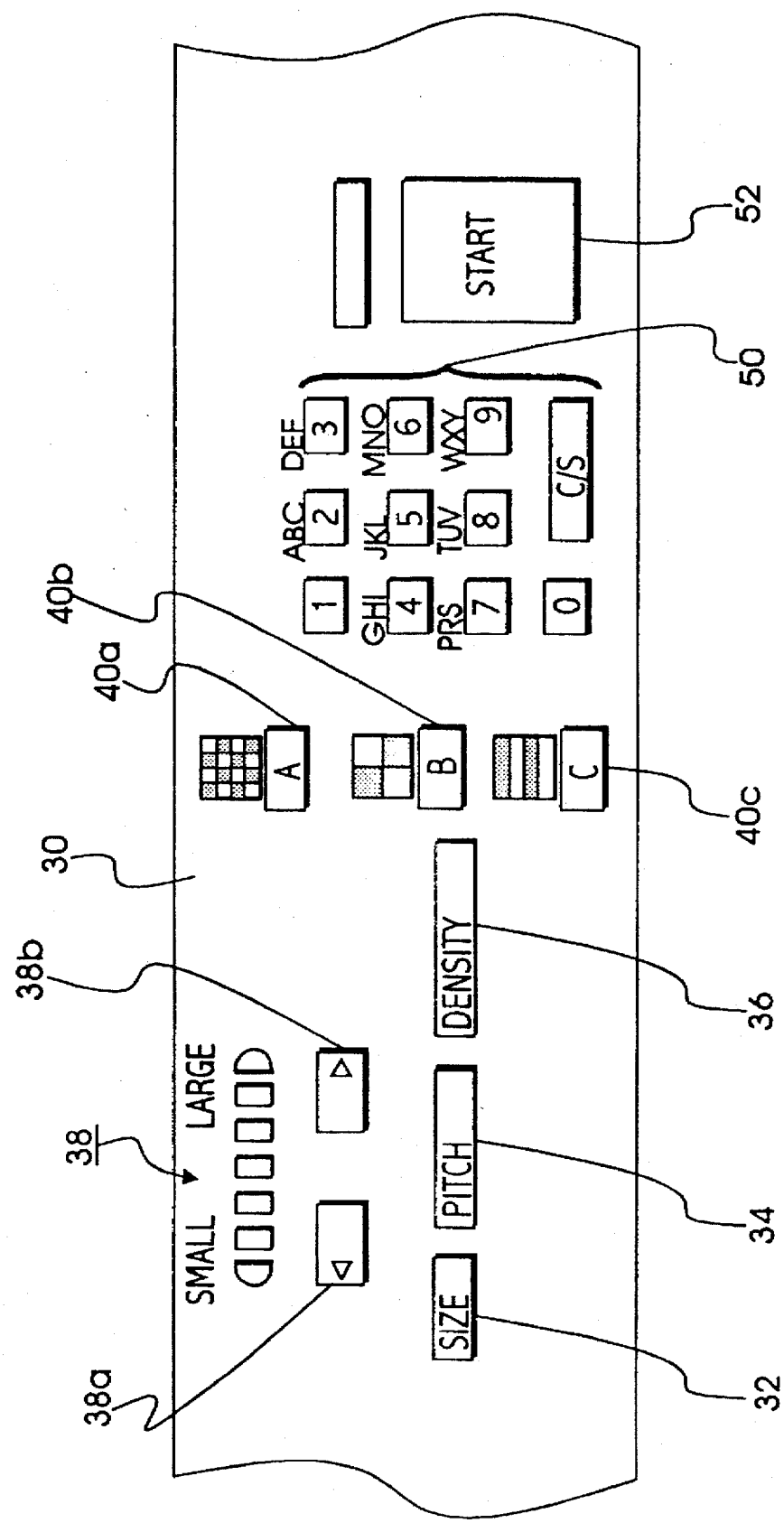
FIG. 2 illustrates an operational panel 30 of FIG. 1 as constructed according to the principles of the present invention for enabling a facsimile sender to enter a personal message for an intended recipient to be printed on a transmitted facsimile message.

As described above, the data sending memory unit 4 includes a first sending memory 22 for storing image data scanned in the scanner 2, a background image memory 24 for storing image data which has been inputted by a sender by way of an operational panel 30, an adder 26 for adding the image data stored in the first sending memory 22 to the image data stored in the background image memory 24, and a second sending memory 28 for storing the added data. The image data manually input by the user can be either alpha-numeric data or character data for identifying, for example, the name of the intended recipient. The image data manually input by the user may also be controlled in terms of size (e.g., the font of the alpha-numeric symbols within the confidential message), pitch, density, and dot matrix pattern by the sender in order to ensure that the image of the added character does not make it difficult to read the image of the facsimile document. For example, the operational panel OP 30 may be constructed as shown in FIG. 2 to include, among other keys such as alpha-numeric keys 50 and a start key 52, or switches, that are manually operable by a user, a character size key 32 for enabling the user to manually, with a single act such as a single manual depression of key 32 for example, to instruct the CPU 10 to set the character size of the personal message. The operational panel OP 30 may also include a print pitch key 34, an image density 36, dot pattern selecting keys 40a, 40b, 40c for enabling the user to set the print pitch, the image density, and the dot matrix pattern of the personal message to be printed along with the facsimile document, albeit with the personal message superimposed upon an area of the facsimile document so that the ratio between the area occupied by one alpha-numeric or typographic symbol in the superimposed personal message is different from the area occupied by the same symbol in the text of the facsimile message. This difference in scale between the text of the superimposed message and facsimile message avoids gross distortion of the binary image data as well as the visual appearance of the printed text of the facsimile message.

Figures 3, 5:
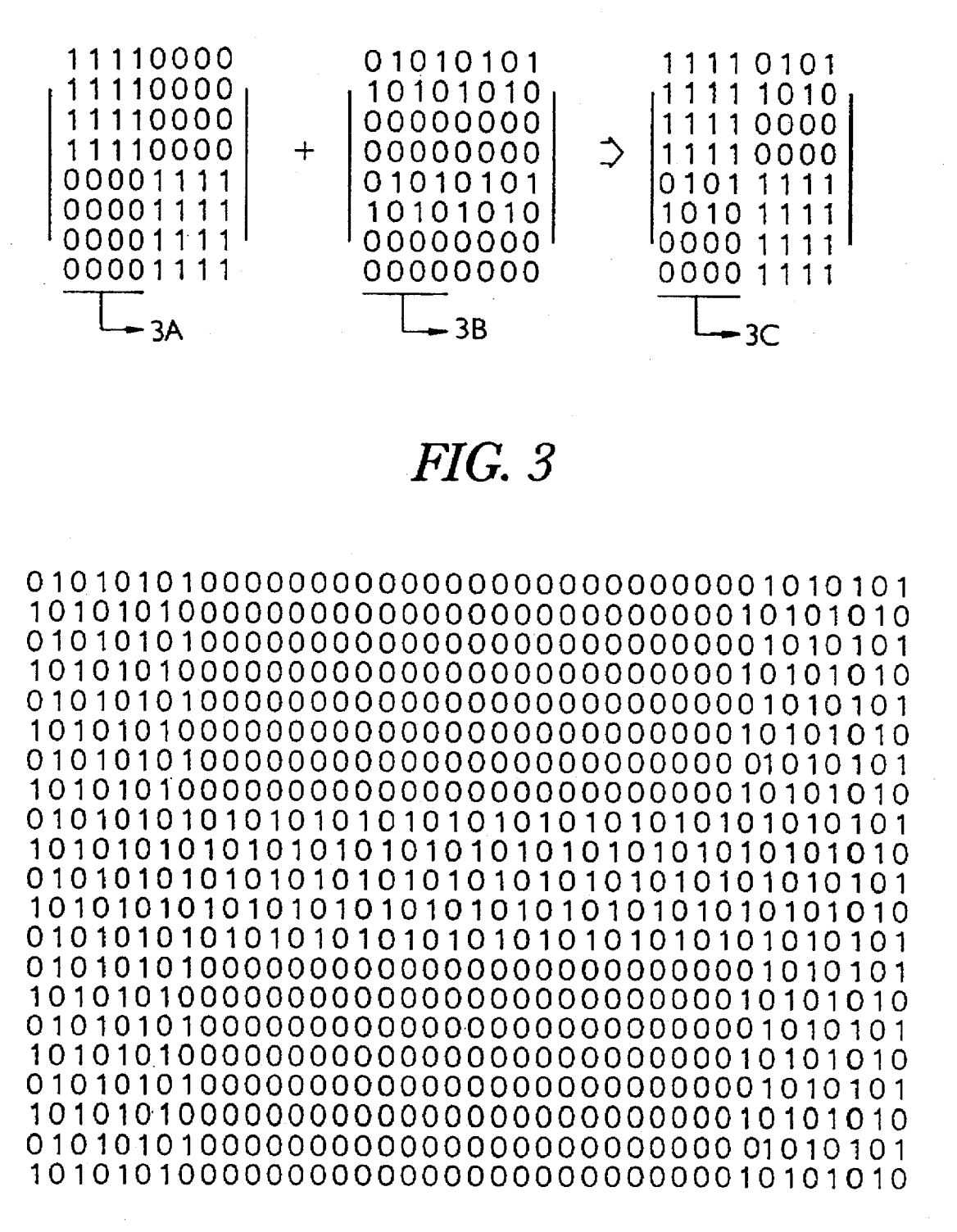

Turning now to FIG. 3 which illustrates an example of how image data are processed between respective memories 22, 24 and 28 of FIG. 1. Digital data 3A received from the scanner 2 which scans document is stored in the first sending memory 22, image data 3B received from the user is stored in the background image memory 24, and composite data 3A and 3B respectively stored in the first sending memory 22 and the background image memory 24 are logically ORed in the adder 26, and thus obtained data 3C is stored in the second sending memory 28.

Background image data is to be received by the intended recipient, and alphabetic and numerical digits are typically utilized as background image data. The background image data is inputted by way of the operation panel OP 30 connected to the CPU 10, at the time the facsimile machine transmits the facsimile message scanned from the scanner 2. The input background image data may be then adjusted to an arbitrary size, a print pitch or image density by way of the adjusting keys 38a, 38b of the LED display 38 as shown in FIG. 2 before they are stored in the background image memory 24.

FIG. 4 illustrates an example of how the personal message entered by the facsimile sender is printed in the background of the facsimile message in the intended recipient's facsimile system in the practice of the present invention. As shown in FIG. 4, the image data such as, for example, "KIMHEEKU" is initially input by the sender for subsequent printing at the intended recipient's facsimile system in the background of the facsimile message.

FIG. 5 illustrates an example of how only a character "H" of the background image data is printed as shown in FIG. 4.

Next, a receiving operation of the facsimile message processed at a receiving side of the facsimile system is described in the following with reference to FIGS. 1 and 4. In a sender's facsimile system, if the image data as shown in FIG. 4, is transmitted, for example, from a remote facsimile system to the telephone line through a network connector 12. Typically, the image signal received through the telephone line is an analog, modulated signal corresponding to image data as shown in FIG. 4. The demodulator 14 converts the analog, modulated signal received through the telephone line into a digital signal. The decoder 16 then decodes the converted digital signal and delivers the decoded signal to a printing memory 18 for temporary storage. Thus, the decoded signal is stored in the printing memory 18 for a given period and is then output through a printing unit 20 for printing. At this time, the stored data output from the printing memory 18 is the image data as shown in FIG. 4.

As set forth above, there is an advantage that the intended recipient's name as the background image data is transmitted from the sender's facsimile system so that the facsimile message can be securely directed to the intended recipient. Also, there is an advantage that if the background image is utilized, the degree of security is displayed and the facsimile message is secured from unnecessary disclosure.

While there have been illustrated and described what are considered to be preferred embodiments of the present invention, it will be understood by those skilled in the art that various changes and modifications may be made, and equivalents may be substituted for elements thereof without departing from the true scope of the present invention. In addition, many modifications may be made to adapt a particular situation to the teaching of the present invention without departing from the central scope thereof. Therefore, it is intended that the present invention not be limited to the particular embodiment disclosed as the best mode contemplated for carrying out the present invention, but that the present invention includes all embodiments falling within the scope of the appended claims.

What is claimed is:

1. A facsimile device comprising:
   an operational panel including a plurality of discrete keys that are independently operable by manual depression from a user;
   a scanner for scanning a document bearing information and obtaining first image data representative of said information;
   means for generating second image data representative of a confidential message directly input manually by the user via said discrete keys from said operational panel to be printed in the background of said first image data;
   data storing means for additively storing said second image data in said first image data;
   encoding means for generating encoded data by encoding composite image data stored in said data storing means representative of said information on the document and said confidential message in the background of said information; and
   modulating means for modulating and transmitting said encoded data to a remote recipient station via a telephone line for enabling said remote recipient station to print said encoded data having said confidential message in the background.

2. The facsimile device of claim 1, further comprising:
   demodulating means for generating demodulated data by demodulating modulated data received from one of said remote recipient station and another remote station via said telephone line;
   decoding means for generating decoded data by decoding said demodulated data; and
   printing means for printing said decoded data by a predetermined unit.

3. The facsimile device of claim 1, wherein said data storing means comprises:
   a first memory for storing said first image data scanned by said scanner;
   a second memory for storing said second image data representative of said confidential message directly input manually by the user via said discrete keys from said operational panel to be printed in the background of said first image data; and
   data synthesizing means for synthesizing said first image data stored in the first memory and said second image data stored in the second memory as said composite image data.

4. The facsimile device of claim 3, further comprised of said data synthesizing means corresponding a logical adder.

5. The facsimile device of claim 3, further comprised of said data storing means comprising a third memory for storing said composite image data synthesized by said data synthesizing means.

6. A method for processing a message for superimposition on textual content of a document in a facsimile device having an operational panel, comprising the steps of:
   scanning textual content of a document to obtain first image data corresponding to the scanned content of the document;
   receiving binary data representing second image data representative of a message directly input manually by the user via an operational panel of said facsimile device to be printed in superimposition across said textual content of said first image data on the document;
   storing additively said second image data and said first image data as composite image data;
   generating encoded data by encoding said composite image data representative of the scanned content of the document and said message as superimposed upon said textual content of the document; and
   modulating and transmitting said encoded data as modulated data to a remote recipient station via a telephone line for enabling said remote recipient station to print said encoded data having said message printed in a background.

7. The method of claim 6, further comprising the steps of:
   generating demodulated data by demodulating modulated data received from one of said remote recipient station and another remote station via said telephone line;

generating decoded data by decoding said demodulated data; and printing said decoded data in a predetermined units.

8. The method of claim 6, further comprising receiving information manually input by the user to establish a ratio between sizes of typographic symbols comprising said textual content of said document and typographic symbols comprising said message.

9. The method of claim 6, further comprised of said data storing step:

storing said first image data representative of the scanned content of said document in a first memory;

storing said second image data representative of said message input manually by the user to be printed in the background of said first image data in a second memory; and synthesizing said first image data stored in the first memory and said second image data stored in the second memory as said composite image data.

10. The method of claim 6, further comprised of said data storing step storing said composite image data synthesized in a third memory prior to being encoded, modulated and transmitted via said telephone line.

11. A facsimile device, comprising:

a scanner for scanning a succession of discrete pages of a multi-page document bearing information and obtaining first image data representing said information;

a first memory for storing said first image data corresponding to each discrete page of said multi-page document;

a second memory for storing second image data representing a personal message input manually by a user to be printed in the background of said first image data corresponding to each discrete page of said multi-page document;

means for superimposing said second image data stored in said second memory onto said first image data corresponding to each discrete page of said multi-page document stored in said first memory at a designated location on each discrete page of said multi-page document, and producing composite image data representing the information of each discrete page of said multi-page document and the personal message superimposed in the background therein; and means for encoding, modulating and transmitting said composite image data to a remote recipient station via a telephone line for enabling said remote recipient station to print said composite image data having said personal message superimposed in the background therein.

12. The facsimile device of claim 11, further comprising:

means for demodulating and decoding modulated data received from one of said remote recipient station and another remote station via said telephone line; and printing means for printing decoded data by a predetermined unit.

13. The facsimile device of claim 11, further comprising a third memory for temporarily storing said composite image data prior to being encoded, modulated and transmitted via said telephone line.

14. The facsimile device of claim 11, further comprised of said means for superimposing said second image data onto said first image data corresponding a logical adder.

15. The device of claim 11, further comprising:

means for manually generating binary data written into said second memory as said second image data.

16. The device of claim 11, further comprising:

means for manually generating binary data written into said second memory as said second image data, and for designating a font of typographic symbols comprising said personal message.

17. A facsimile device, comprising:

an operational panel having a plurality of discrete keys that are independently operable by manual depression from a user to set transmission of a personal message input manually by the user superimposed on each discrete page of a document to a remote recipient station via a telephone line;

a scanner for scanning said document bearing information and obtaining first image data representing said information;

a first memory for storing said first image data corresponding to said document;

a second memory for storing second image data representing said personal message input manually by the user via said operational panel to be superimposed on said first image data corresponding to said document;

means for superimposing said second image data stored in said second memory onto said first image data corresponding to said document stored in said first memory at a designated location on each discrete page of said document, and producing composite image data representing the information of each discrete page of said document and the personal message superimposed thereon in the background of each discrete page of said document;

a third memory for temporarily storing said composite image data representing the information of each discrete page of said document and the personal message superimposed thereon in the background of each discrete page of said document; and means for transmitting said composite image data to a remote recipient station via a telephone line for enabling said remote recipient station to print said composite image data having said personal message superimposed thereon in the background.

18. The facsimile device of claim 17, further comprising:

means for receiving image data from one of said remote recipient station and another remote station via said telephone line; and printing means for printing the image data by a predetermined unit.

19. The facsimile device of claim 17, further comprising:

means for manually generating binary data written into said second memory as said second image data, and for designating a font of typographic symbols comprising said personal message.

20. The facsimile device of claim 17, further comprised of said means for superimposing said second image data onto said first image data corresponding to a logical adder.

* * * * *